US011327751B2

(12) United States Patent
Kawachiya

(10) Patent No.: US 11,327,751 B2
(45) Date of Patent: *May 10, 2022

(54) RESILIENT DISTRIBUTED GARBAGE COLLECTION

(71) Applicant: INTERNATIONAL BUSINESS MACHINES CORPORATION, Armonk, NY (US)

(72) Inventor: Kiyokuni Kawachiya, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,470

(22) Filed: Oct. 29, 2019

(65) Prior Publication Data

US 2020/0065093 A1 Feb. 27, 2020

Related U.S. Application Data

(63) Continuation of application No. 14/970,327, filed on Dec. 15, 2015, now Pat. No. 10,467,005.

(51) Int. Cl.
*G06F 9/00* (2006.01)
*G06F 12/02* (2006.01)

(52) U.S. Cl.
CPC ............ *G06F 9/00* (2013.01); *G06F 12/0261* (2013.01); *G06F 2212/154* (2013.01); *G06F 2212/70* (2013.01)

(58) Field of Classification Search
CPC .. G06F 9/00; G06F 12/0261; G06F 2212/154; G06F 2212/70
See application file for complete search history.

(56) References Cited

U.S. PATENT DOCUMENTS 5,241,673 A * 8/1993 Schelvis ............. G06F 12/0269
707/758
5,446,915 A * 8/1995 Pierce ........................ G06F 9/54
712/11

(Continued)

OTHER PUBLICATIONS

Crafa, et al., "Semantics of (Resilient) X10", arXiv.org, Dec. 2013, 26 Pages.

(Continued)

*Primary Examiner* — Alford W Kindred
*Assistant Examiner* — Lin Lin M Htay
(74) *Attorney, Agent, or Firm* — Tutunjian & Bitetto, P.C.

(57) ABSTRACT

In a distributed processing system having multiple processing nodes including alive nodes and dead nodes, a method is provided for collecting an object from the alive nodes. The method includes maintaining a separate count value for each of remote nodes at which the object is remotely-referenced. The method further includes collecting the object for garbage collection when the separate count value for all of the remotes nodes is zero. The method also includes adding at least one per node sending counter responsive to a remote reference of the object being sent from a first remote node to a particular one of the remote nodes. The at least one per node sending counter is added at the first remote node to count a number of remote-references of the object being sent to the particular one of the remote nodes.

13 Claims, 13 Drawing Sheets

(56) References Cited

U.S. PATENT DOCUMENTS

| | | | | |
|---|---|---|---|---|
| 5,808,911 A * | 9/1998 | Tucker | ................ | G06F 12/0261 |
| | | | | 711/E12.01 |
| 6,138,251 A * | 10/2000 | Murphy | .................. | G06F 9/465 |
| | | | | 714/41 |
| 8,041,735 B1 * | 10/2011 | Lacapra | ................ | G06F 16/182 |
| | | | | 707/783 |
| 9,021,297 B1 * | 4/2015 | Hayes | ................. | G06F 11/1469 |
| | | | | 714/6.3 |
| 2003/0084160 A1 * | 5/2003 | Berkowitz | .............. | G06F 16/27 |
| | | | | 709/226 |
| 2003/0217140 A1 * | 11/2003 | Burbeck | ........... | H04L 29/12009 |
| | | | | 709/224 |
| 2005/0027760 A1 * | 2/2005 | Knobe | ................ | G06F 12/0269 |
| 2011/0125813 A1 * | 5/2011 | Pradhan | ............. | G06F 12/0269 |
| | | | | 707/814 |
| 2016/0070593 A1 * | 3/2016 | Harris | ................ | G06F 9/45558 |
| | | | | 718/106 |
| 2016/0335319 A1 * | 11/2016 | Teodorescu | ......... | H04L 67/1002 |

OTHER PUBLICATIONS

Cunningham, et al., "Resilient X10 Efficient Failure-aware Programming", IBM, 2009, 42 Pages.

Maheshwari, et al., "Fault-Tolerant Distributed Garbage Collection in a Client-Server Object-Oriented Database", Proceedings of the Third International Conference on Parallel and Distributed Information Systems, Sep. 1994 pp. 1-10.

Kawachiya, et al., "Distributed Garbage Collection for Managed X10", IBM, Jun. 2014, pp. 1-17.

List of IBM Patents or Patent Applications Treated as Related dated Oct. 29, 2019, 2 pages.

\* cited by examiner

```
1  class ResilientMontePi {
2    static val ITERS = 1000000000 / Place.numPlaces();
3    public static def main(args:Rail[String]) {
4      val resultCell = new Cell(Pair[Long,Long](0,0));  // will be referenced remotely
5      val resultRef = GlobalRef(resultCell);
6      finish for (p in Place.places()) async {
7        try {
8          at (p) {
9            val rnd = new Random(System.nanoTime());
10           var c:Long = 0;
11           for (iter in 1..ITERS) {      // ITERS trials per place
12             val x = rnd.nextDouble(), y = rnd.nextDouble();
13             if (x*x + y*y <= 1.0) c++;  // if inside the circle
14           }
15           val count = c;
16           at (resultRef) atomic {       // update the global result
17             val r = resultRef(); r() = Pair(r().first+count, r().second+ITERS);
18           } }
19         } catch (e:DeadPlaceException) { /* just ignore place death */ }
20       } // end of finish, wait for the execution in all places
21       val pair = resultRef()(); // (points_in_circle, points_tested)
22       val pi = 4.0 * pair.first / pair.second;
23       Console.OUT.println("pi="+pi + " (try="+pair.second+")");
24 } }
```

FIG. 3

RESILIENT DISTRIBUTED GARBAGE COLLECTION

BACKGROUND

Technical Field

The present invention relates generally to information processing and, in particular, to resilient distributed garbage collection.

Description of the Related Art

X10 is a distributed programming language that can use multiple computing nodes (places). In X10, objects can be remotely-referenced from other places, and an implementation of X10 on Java, named "Managed X10", has a distributed garbage collection mechanism to collect such objects when they are no longer referenced remotely and locally.

Recently, X10 was extended to support fault tolerance as "Resilient X10", which allows for continued processing even when some places are dead. By appropriately handling a newly-added "DeadPlaceException", applications can easily support fault tolerance.

However, current distributed garbage collection in X10 cannot collect objects remotely-referenced from so called dead places (dead computer nodes). This does not affect the program behavior, but may cause OutOfMemoryError as uncollectable garbage objects increase.

Thus, in a distributed processing environment, there is a need for improved garbage collection whereby objects are correctly selected for garbage collection even when some computing nodes are dead.

SUMMARY

According to an aspect of the present principles, in a distributed processing system having multiple processing nodes including alive nodes and dead nodes, a method is provided for collecting an object from the alive nodes. The method includes maintaining a separate count value for each of remote nodes at which the object is remotely-referenced. The method further includes collecting the object for garbage collection when the separate count value for all of the remotes nodes is zero. The method also includes adding at least one per node sending counter responsive to a remote reference of the object being sent from a first remote node to a particular one of the remote nodes. The at least one per node sending counter is added at the first remote node to count a number of remote-references of the object being sent to the particular one of the remote nodes.

According to another aspect of the present invention, a computer program product is provided for a method for collecting an object in a distributed processing system having multiple processing nodes including alive nodes and dead nodes. The computer program product includes a non-transitory computer readable storage medium having program instructions embodied therewith. The program instructions are executable by a computer to cause the computer to perform a method. The method includes maintaining a separate count value for each of remote nodes at which the object is remotely-referenced. The method further includes collecting the object for garbage collection when the separate count value for all of the remotes nodes is zero. The method also includes adding at least one per node sending counter responsive to a remote reference of the object being sent from a first remote node to a particular one of the remote nodes. The at least one per node sending counter is added at the first remote node to count a number of remote-references of the object being sent to the particular one of the remote nodes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein

FIG. 3 shows an exemplary fault tolerant program 300 in the X10 programming language to which the present principles can be applied, in accordance with an embodiment of the present principle;

DETAILED DESCRIPTION OF PREFERRED EMBODIMENTS

The present principles are directed to resilient distributed garbage collection.

Advantageously, the present principles can collect objects remotely-referenced from dead places, while minimizing the additional overhead in normal execution. As used herein, a local reference denotes a reference to an object from the same place (same node), while a remote reference denotes a reference to an object from a remote place (remote node). Thus, fault tolerance of a distributed processing system is enhanced by the present principles, because a memory leak by node failures in the distributed processing system can be avoided.

The proposed mechanism can use existing local garbage collection (such as garbage collection in each Java VM) without modification.

For that purpose, a flag (GOT.strongRef) is introduced for each globalized object to suppress its local collection. To control the flag, an array structure (GOT.count[NPLACES]) is prepared for each globalized object to maintain the number of remote-references from each node. Having the counter as a per-object/per-remote-node array makes it easier to handle the node failure (place death), because list-scanning or reference-reconstruction are unnecessary.

The proposed mechanism does not use additional synchronous communication to send a remote-reference to another node. Existing methods need synchronous communication with the home node before sending the remote-reference, which slows down the remote procedure call.

Figure 1:
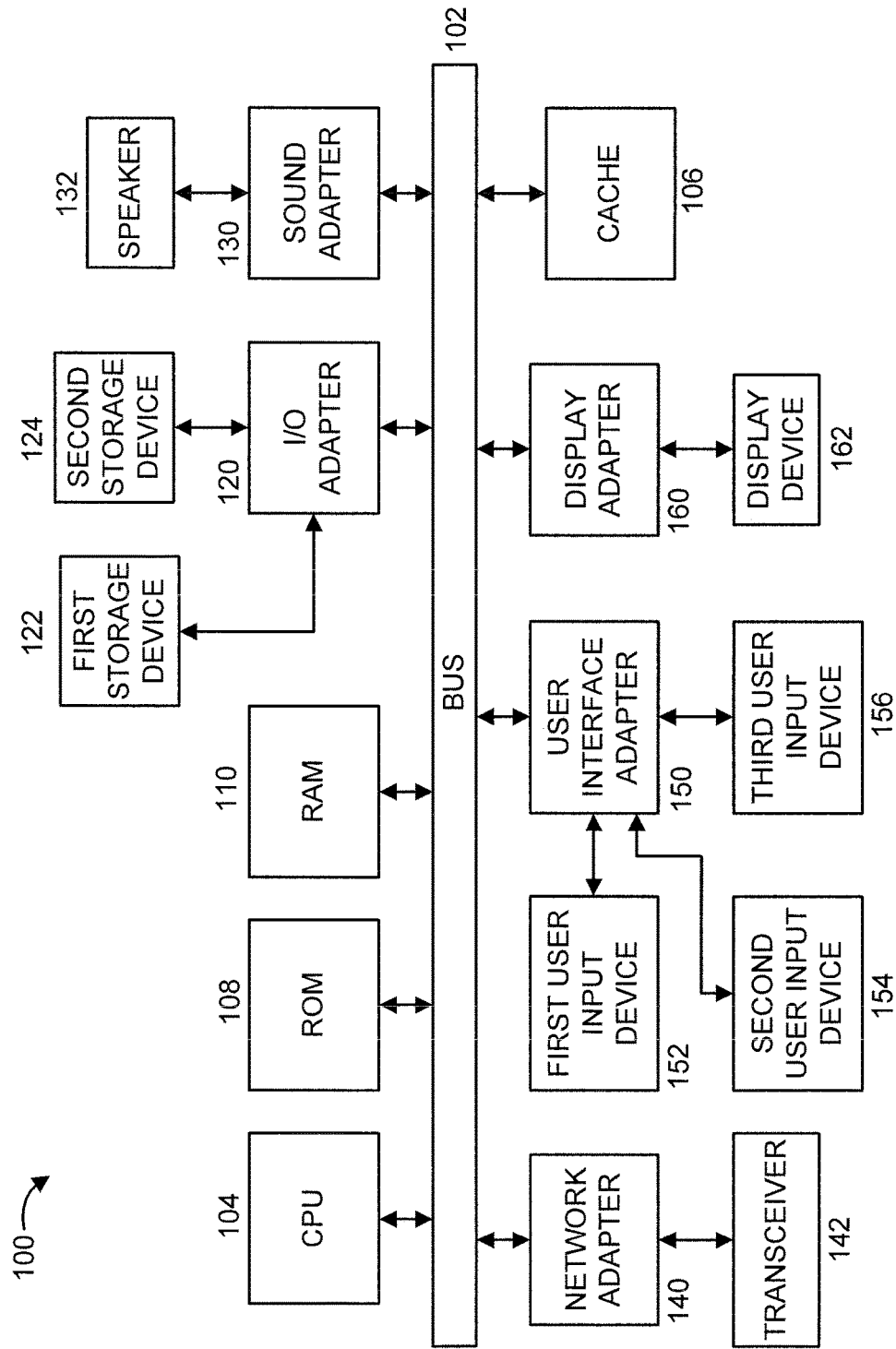
FIG. 1 shows an exemplary processing system 100 for a node, to which the present principles may be applied, in accordance with an embodiment of the present principles.

FIG. 1 shows an exemplary processing system 100 for a node, to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
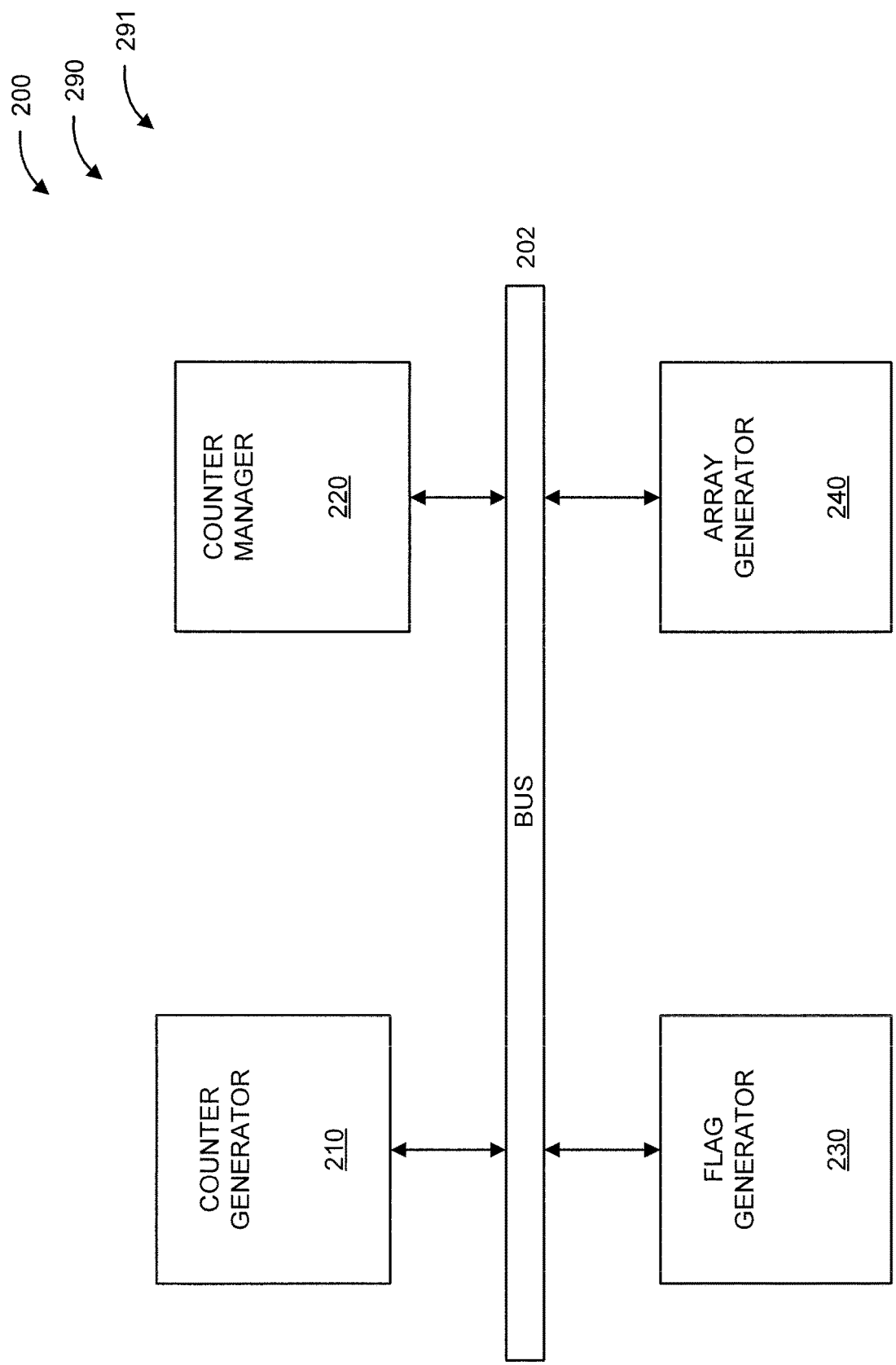
FIG. 2 shows an exemplary system 200 for resilient distributed garbage collection, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 4:
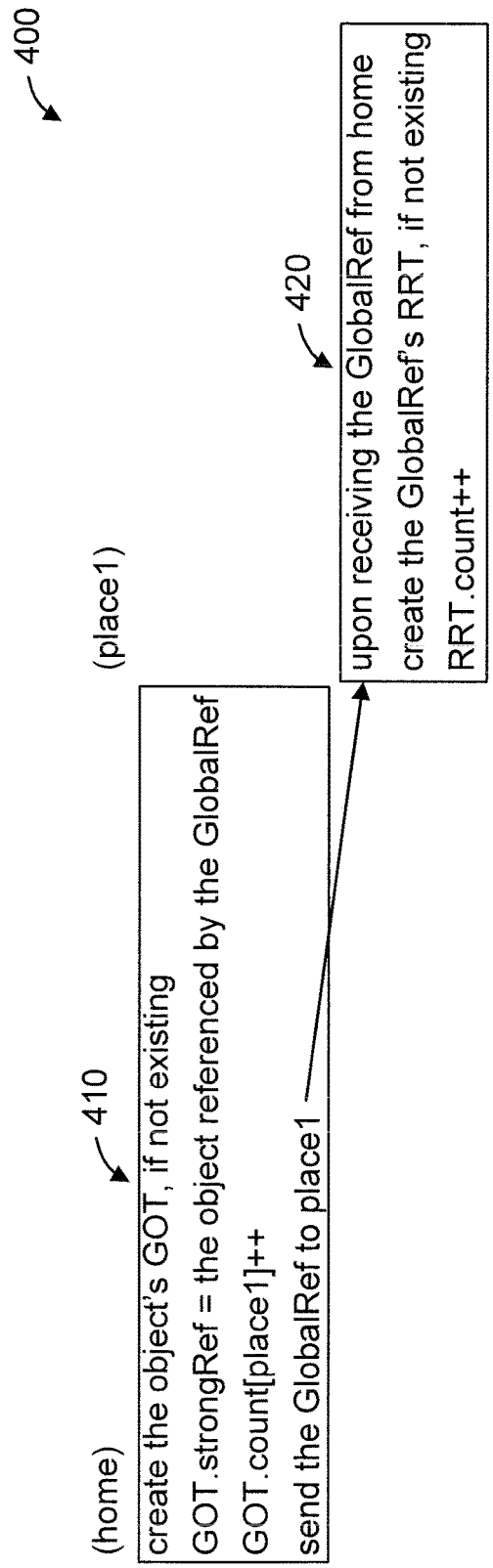
FIG. 4 shows exemplary code for a method 400 for sending a local GlobalRef from its home place to a remote place1, in accordance with an embodiment of the present principles.

Further, it is to be appreciated that processing system 100 may perform at least part of the method described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

FIG. 2 shows an exemplary system 200 for resilient distributed garbage collection, in accordance with an embodiment of the present principles.

In the embodiment of FIG. 2, system 200 is used in a distributed processing system 290 having multiple processing nodes that include alive nodes and dead nodes.

The system 200 includes, at each node 291, a counter generator 210, a counter manager 220, a flag manager 230, and an array generator 240.

The counter generator 210 generates counters for use in accordance with the present principles. For example, a respective counter can be generated for each remote node at which an object is remotely referenced. Moreover, a respective counter can be generated for each place from which a remote-reference is sent and each remote place to which the remote-reference is sent.

The counter manager 220 manages the counters at a given node, and performs updates on the counters and the counter values based on the existence of certain conditions (e.g., nodes dying, sending of remote-references).

The flag manager 230 sets, resets and performs other operations for managing flags relating to garbage collection in accordance with the present principles. For example, the flag manager 230 sets a flag (GOT.strongRef) for each globalized object to suppress its local collection. The flag (GOT.strongRef) for a particular globalized object can be reset to enable local collection of a particular globalized object.

The array generator 240 generates an array (GOT for each globalized object. The array is used to control the corresponding flag (GOT.strongRef) for a particular globalized object. In an embodiment, the array is used to maintain the number of remote-references from each node.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

FIG. 3 shows an exemplary fault tolerant program 300 in the X10 programming language to which the present principles can be applied, in accordance with an embodiment of the present principles.

Some exemplary data structures in X10 runtime include the following, which are implicated in the examples of FIGS. 4-13:

GOT (GlobalizedObjectTracker)—tracks a remotely-referenced (globalized) object
  weakRef //Weak reference to the globalized object
  strongRef //Strong reference to the object, or null
  count[NPLACES] //Per-place remote-reference counter
  id //ID of the remote-reference (GlobalRef)
RRT (RemoteReferenceTracker)—tracks a remote-reference (remote GlobalRef)
  weakRef //Weak reference to the remote GlobalRef
  home //Home place of the remotely-referenced obj
  id //ID of the remote-reference (GlobalRef)
  count //Number of remote-references (matches GOT.count[place])
  sending[NPLACES] //Per-place remote-ref sending counter The term "strong reference to the object" refers to a normal reference which garbage collector takes into account. The term "weak reference to the object" refers to a special reference which garbage collector does not take into account. Even when an object is referred to only by weak references, the object will be collected by a garbage collector and the weak reference owner (GOT or RRT in this example) will be notified of the deletion of the object. In FIGS. 10-13, an arrow having a solid lead line denotes a normal reference, an arrow having a dashed lead line denotes a remote reference, and an arrow having a dashed and dotted lead line denotes a weak reference.

FIG. 4 shows exemplary code for a method 400 for sending a local GlobalRef from its home place to a remote place1, in accordance with an embodiment of the present principles.

At step 410, regarding the home place:
create the object's GOT, if not existing
GOT.strongRef=the object referenced by the GlobalRef
GOT.count[place1]++
send the GlobalRef to place1.
At step 420, regarding place1:
upon receiving the GlobalRef from home
create the GlobalRef's RRT, if not existing
RRT.count++.

Figure 5:
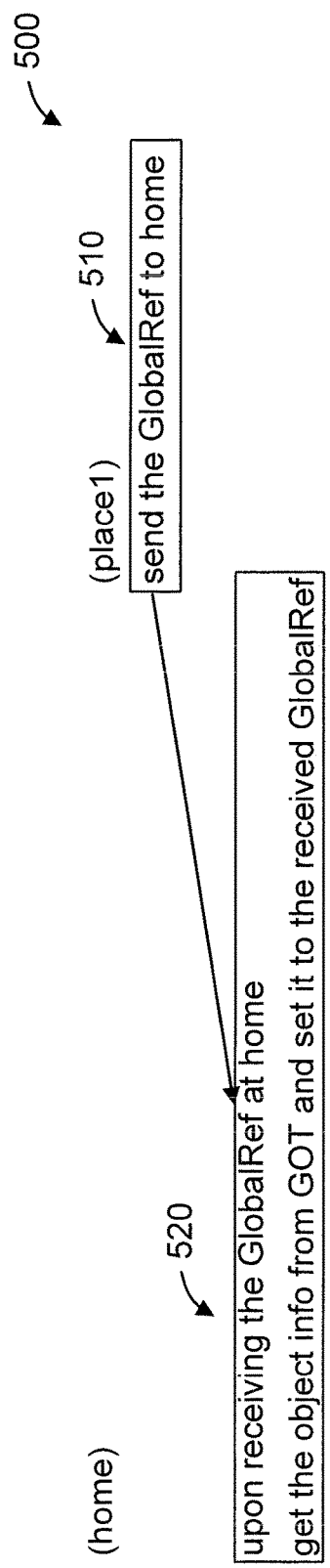
FIG. 5 shows exemplary code for a method 500 for sending a remote GlobalRef from place1 to its home place, in accordance with an embodiment of the present principle.

FIG. 5 shows exemplary code for a method 500 for sending a remote GlobalRef from place1 to its home place, in accordance with an embodiment of the present principle.

At step 510, regarding place1:
send the GlobalRef to home.
At step 520, regarding the home place:
upon receiving the GlobalRef at home
get the object info from GOT and set it to the received GlobalRef.

Figure 6:
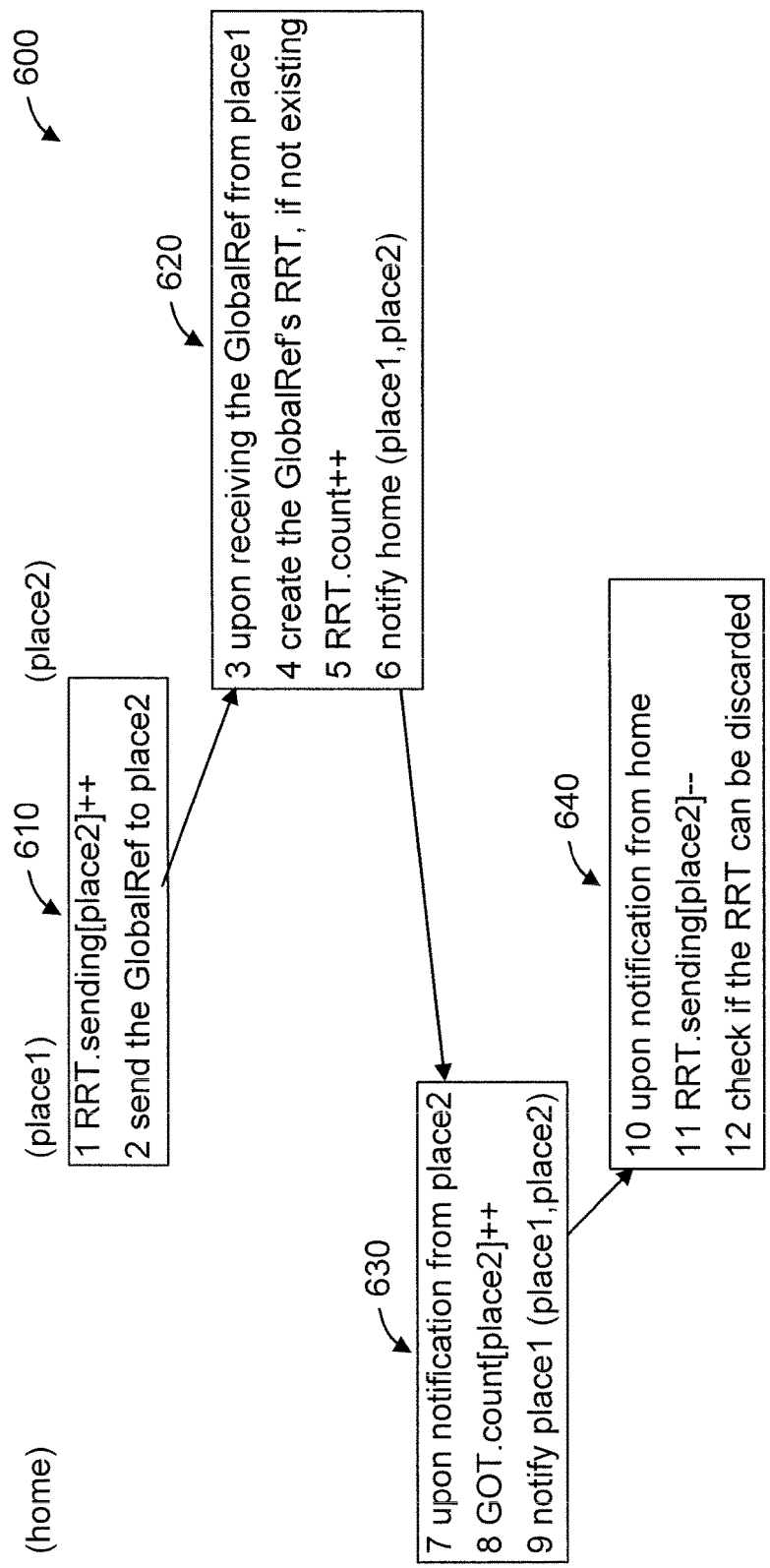
FIG. 6 shows exemplary code for a method 600 for sending the remote GlobalRef from place1 to another remote place2, in accordance with an embodiment of the present principle.

FIG. 6 shows exemplary code for a method 600 for sending the remote GlobalRef from place1 to another remote place2, in accordance with an embodiment of the present principle. Thus involves: (1) suppressing the object collection by incrementing the sending counter (step 1); and decrementing the counter when the circulate notification returns (step 11).

At step 610, regarding place1:
1 RRT.sending[place2]++
2 send the GlobalRef to place2.
At step 620, regarding place2:
3 upon receiving the GlobalRef from place1
4 create the GlobalRef's RRT, if not existing
5 RRT.count++
6 notify home (place1,place2).
At step 630, regarding the home place:
7 upon notification from place2
8 GOT.count[place2]++
9 notify place1 (place1,place2).
At step 640, regarding place1:
10 upon notification from home
11 RRT.sending[place2]
12 check if the RRT can be discarded (method 800 of FIG. 8).

Figure 7:
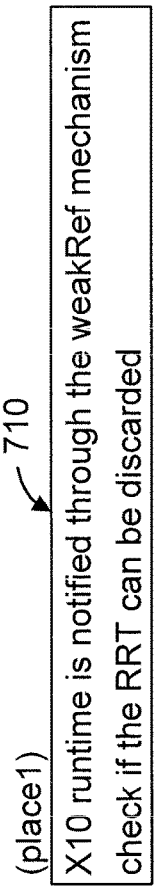
FIG. 7 shows exemplary code for a method 700 performed when the remote GlobalRef is collected at place1, in accordance with an embodiment of the present principles.

FIG. 7 shows exemplary code for a method 700 performed when the remote GlobalRef is collected at place1, in accordance with an embodiment of the present principles.

At step 710, regarding place1:
X10 runtime is notified through the weakRef mechanism
check if the RRT can be discarded (method 800 of FIG. 8).

Figure 8:
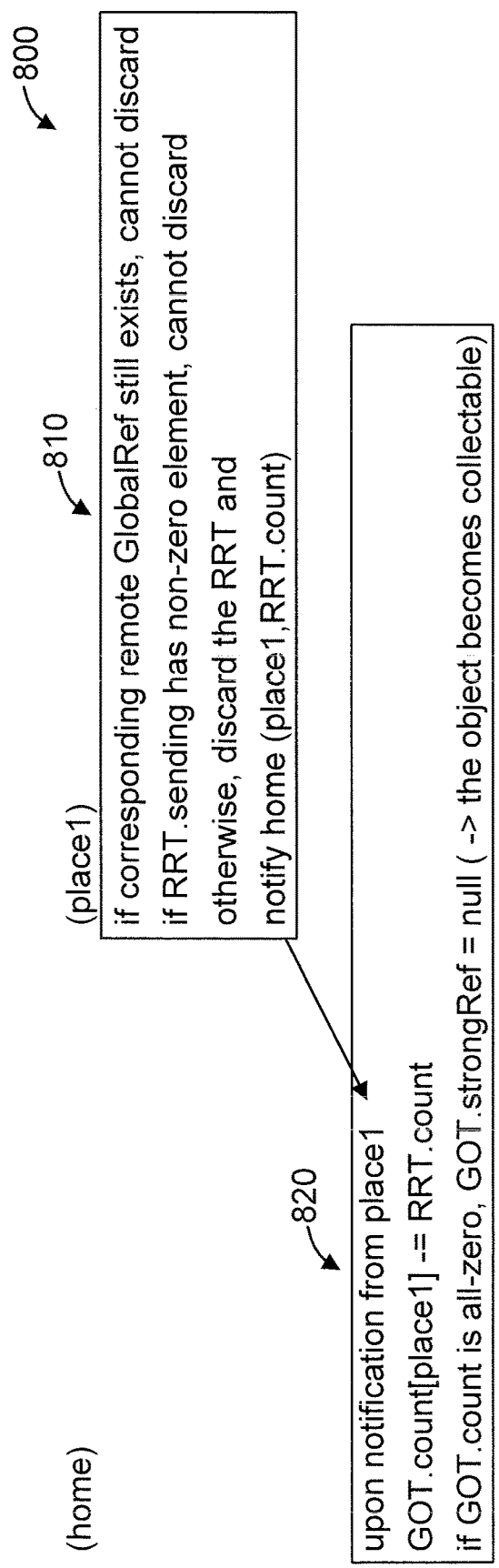
FIG. 8 shows exemplary code for a method 800 for checking if an RRT at place1 can be discarded, in accordance with an embodiment of the present principle.

FIG. 8 shows exemplary code for a method 800 for checking if an RRT at place1 can be discarded, in accordance with an embodiment of the present principle.

At step 810, regarding place1:
if corresponding remote GlobalRef still exists, cannot discard
if RRT.sending has non-zero element, cannot discard
otherwise, discard the RRT and
notify home (place1,RRT.count).
At step 820, regarding the home place:
upon notification from place1
GOT.count[place1]-=RRT.count
if GOT.count is all-zero, GOT.strongRef=null (→the object becomes collectable).

Figure 9:
FIG. 9 shows exemplary code for a method 900 performed at remaining places when place2 is dead, in accordance with an embodiment of the present principle.

FIG. 9 shows exemplary code for a method 900 performed at remaining places when place2 is dead, in accordance with an embodiment of the present principle.

At step 910, regarding remaining places when place2 is dead: wait until all GlobalRef-related notifications are processed at all remaining places for each GOT at the place,
  GOT.count[place2]=0; if GOT.count is all-zero,
    GOT.strongRef=null for each RRT at the place,
  RRT.sending[place2]=0, and check if the RRT can be
    discarded
  if RRT.home==place2, set RRT.sending all-zero and
    check if the RRT can be discarded.

FIGS. 10-13 show the states of Place0, Place1, and Place2 at a specific phase of the embodiment. Upper boxes show data in the X10 application and lower boxes show internal data structure in X10 runtimes. Solid arrows represent strong (normal) reference, dash arrows represent remote reference, and dash-dot arrows represent weak references.

Figure 10:
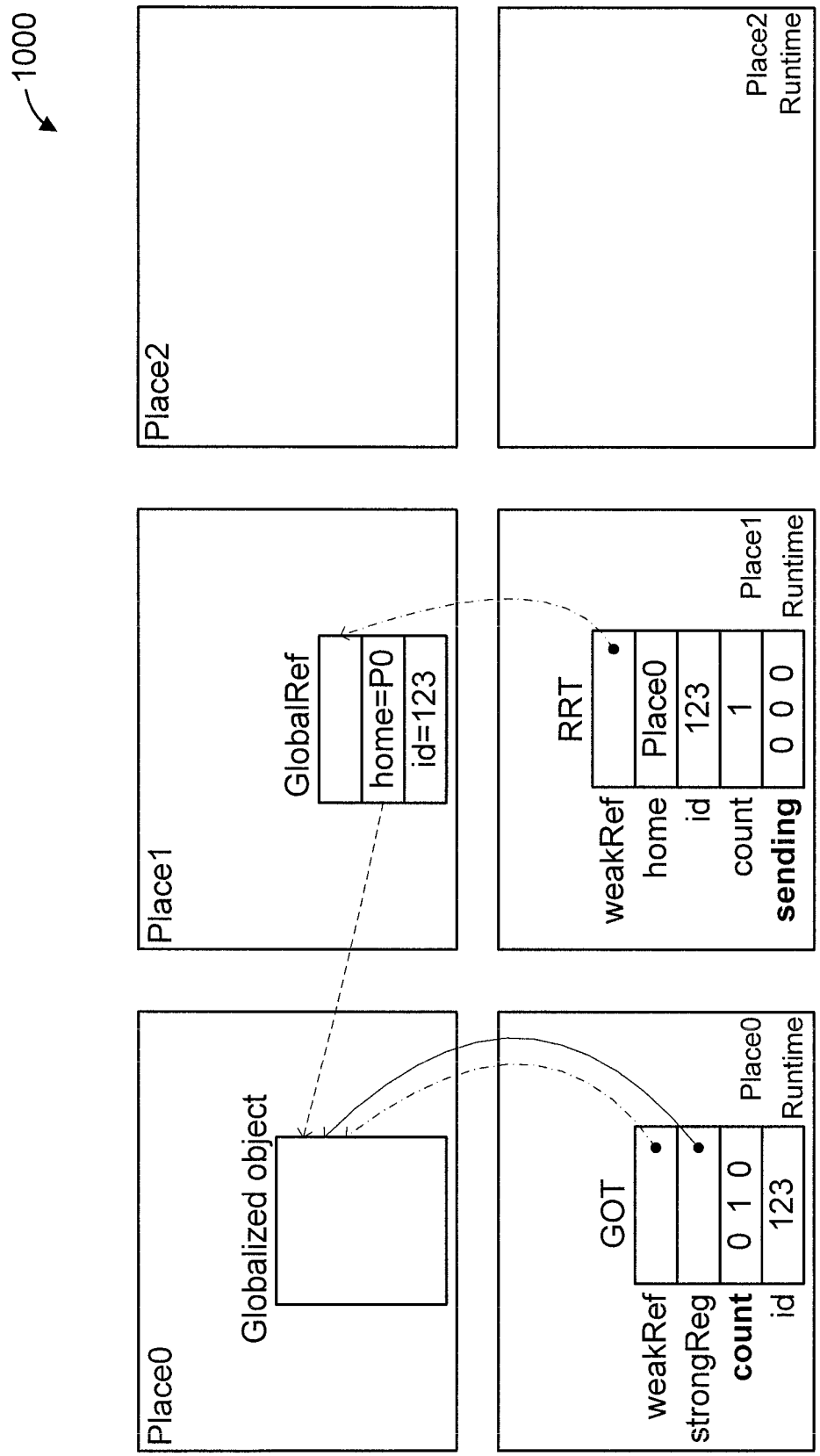
FIG. 10 shows initial states 1000 of Place0, Place1, and Place 2 before sending GlobalRef at Place1 to Place2 (before step 1 in FIG. 6), in accordance with an embodiment of the present principles.

FIG. 10 shows initial states 1000 of Place0, Place1, and Place 2 before sending GlobalRef at Place1 to Place2 (before step 1 in FIG. 6), in accordance with an embodiment of the present principles. The top three boxes represent pre-runtime states for Place0, Place1, and Place 2 (the same applies to FIGS. 11-13). The bottom three boxes represent runtime states for Place0, Place1, and Place2 (the same applies to FIGS. 11-13).

Figure 11:
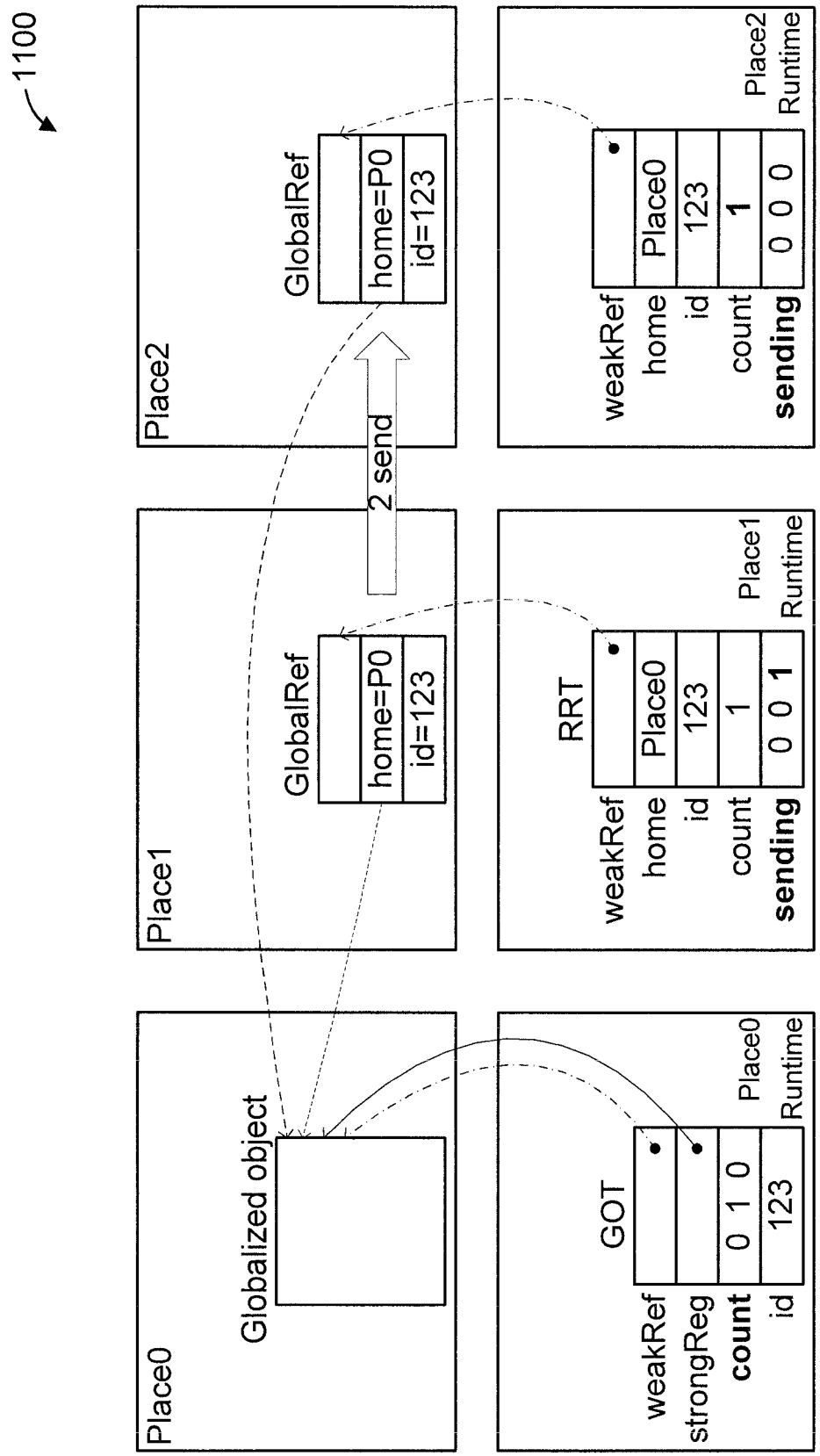
FIG. 11 shows states 1100 of Place0, Place1, and Place 2 just after step 5 (in FIG. 6), in accordance with an embodiment of the present principles. GOT.count[P2] is still 0, but RRT.sending[P2] at Place1 is 1.

FIG. 11 shows states 1100 of Place0, Place1, and Place 2 just after step 5 (in FIG. 6), in accordance with an embodiment of the present principles. GOT.count[P2] is still 0, but RRT.sending[P2] at Place1 is 1. The arrow specifying "2 send" corresponds to the 2nd step in FIG. 6, namely "2 send the GlobalRef to place2".

Figure 12:
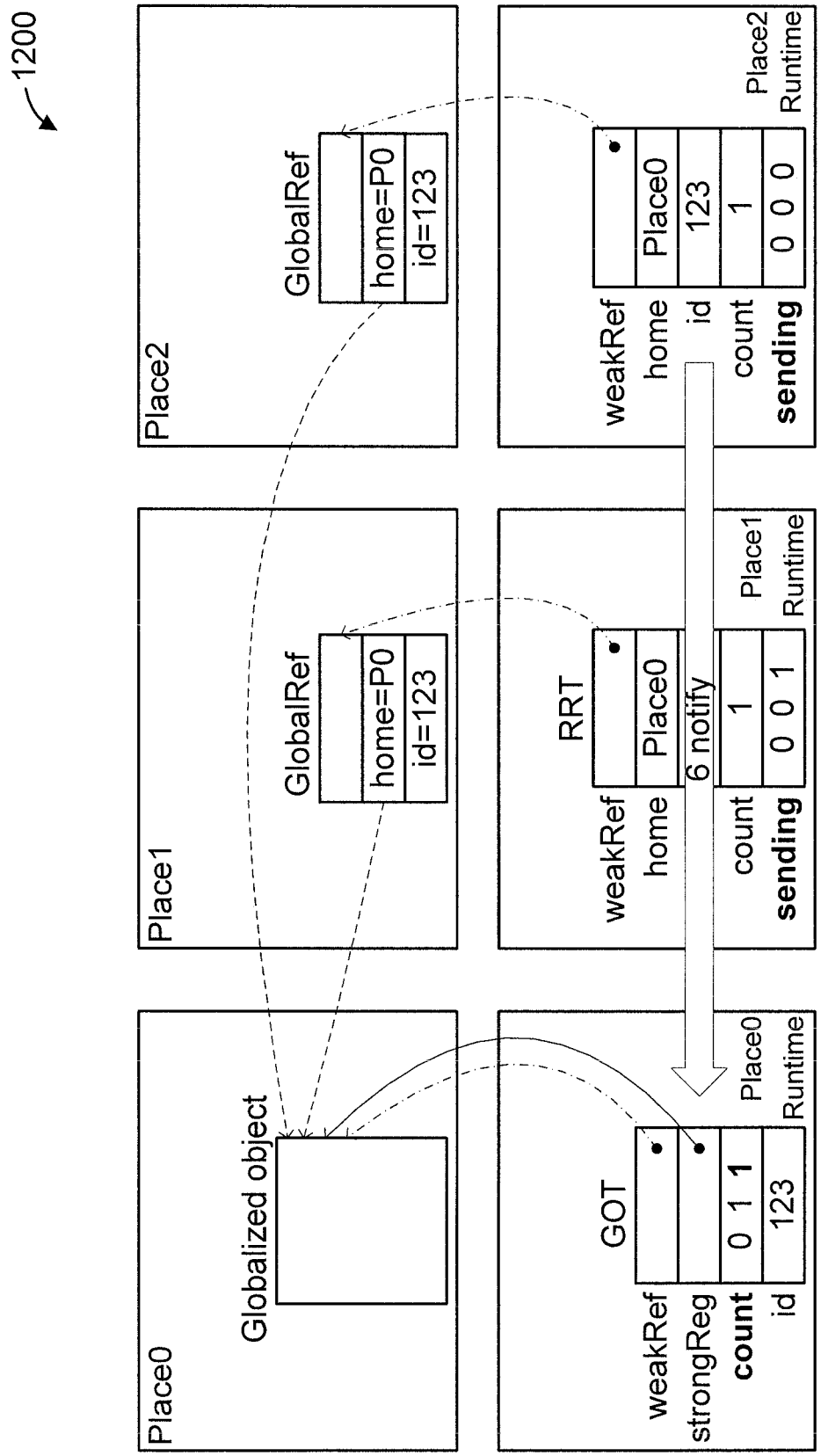
FIG. 12 shows states 1200 of Place0, Place1, and Place 2 just after step 8 (in FIG. 6), in accordance with an embodiment of the present principles. GOT.count[P2] was set to 1.

FIG. 12 shows states 1200 of Place0, Place1, and Place 2 just after step 8 (in FIG. 6), in accordance with an embodiment of the present principles. GOT.count[P2] was set to 1. The arrow specifying "6 notify" corresponds to the 6th step in FIG. 6, namely "6 notify home (place1,place2)".

Figure 13:
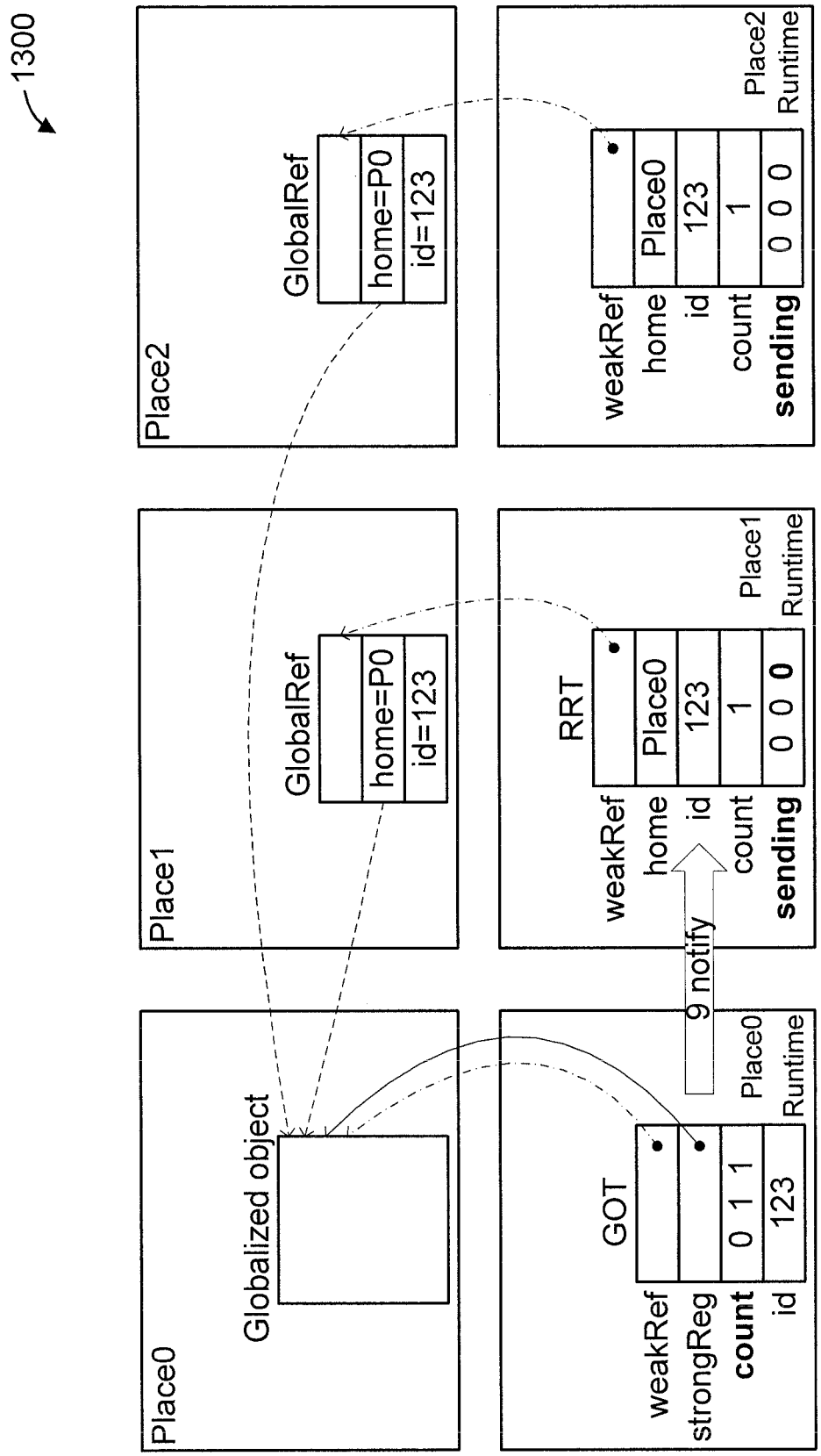
FIG. 13 shows states 1300 of Place0, Place1, and Place 2 just after step 12 (in FIG. 6), in accordance with an embodiment of the present principles. RRT.sending[P2] at Place1 returned to 0.

FIG. 13 shows states 1300 of Place0, Place1, and Place 2 just after step 12 (in FIG. 6), in accordance with an embodiment of the present principles. RRT.sending[P2] at Place1 is returned to 0. The arrow specifying "9 notify" corresponds to the 9th step in FIG. 6, namely "9 notify place1 (place1, place2)".

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 14:
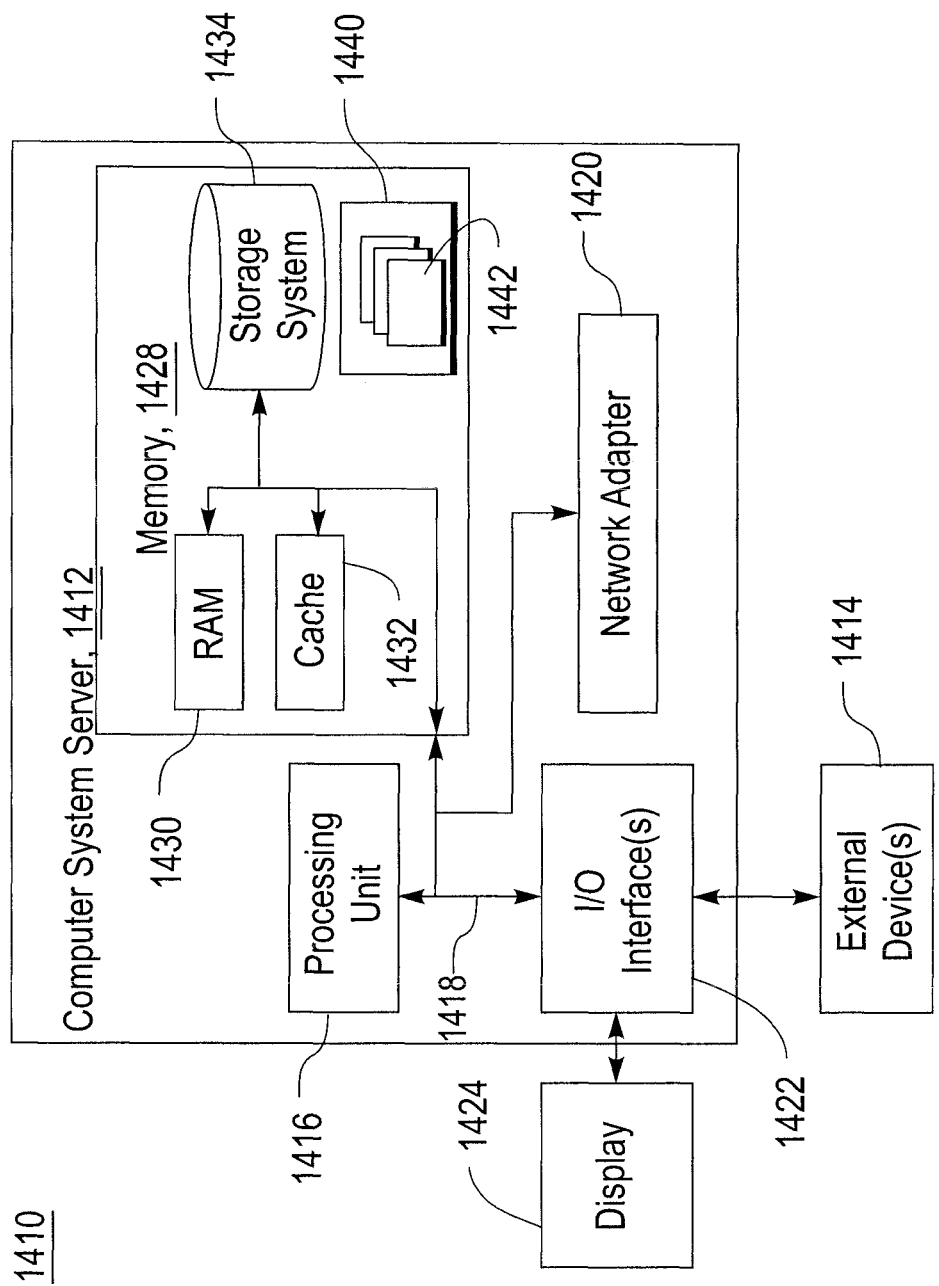
FIG. 14 shows an exemplary cloud computing node 1410, in accordance with an embodiment of the present principles.

Referring now to FIG. 14, a schematic of an example of a cloud computing node 1410 is shown. Cloud computing node 1410 is only one example of a suitable cloud computing node and is not intended to suggest any limitation as to the scope of use or functionality of embodiments of the invention described herein. Regardless, cloud computing node 1410 is capable of being implemented and/or performing any of the functionality set forth hereinabove.

In cloud computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
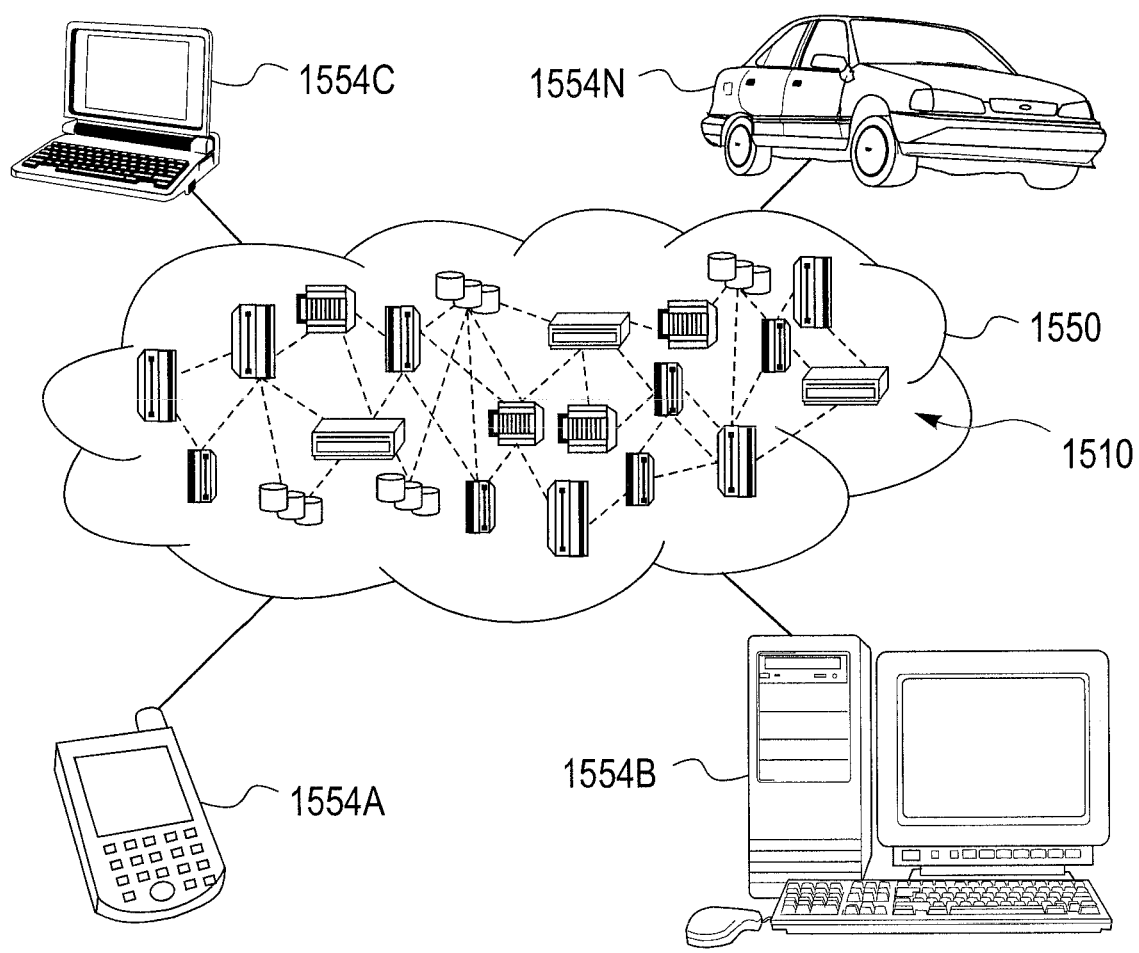
FIG. 15 shows an exemplary cloud computing environment 1550, in accordance with an embodiment of the present principles.

Referring now to FIG. 15, illustrative cloud computing environment 1550 is depicted. As shown, cloud computing environment 1550 comprises one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1510 and cloud computing environment 1550 can communicate with any type of computerized device over any type of network and/or network addressable connection (e.g., using a web browser).

Figure 16:
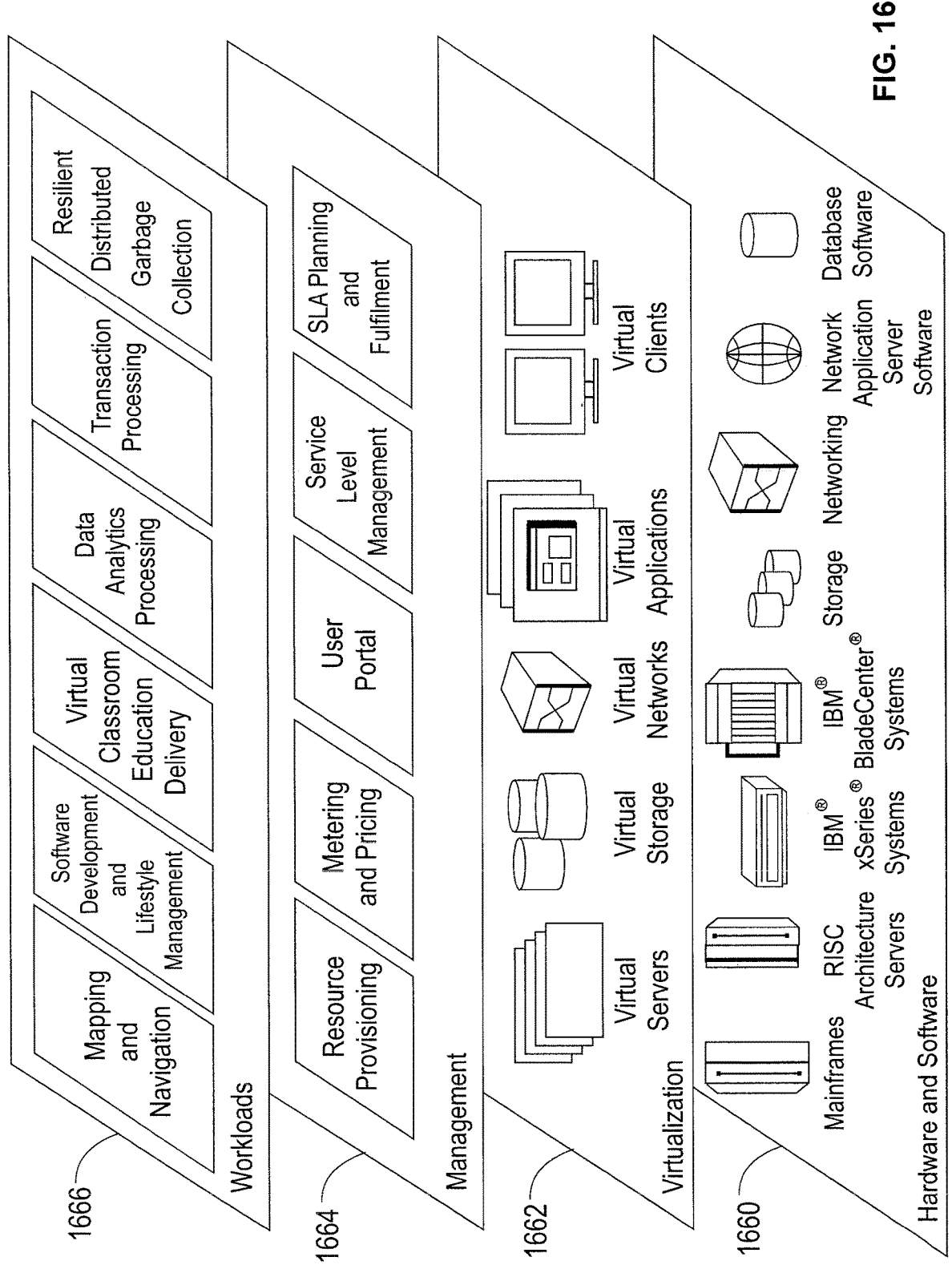
FIG. 16 shows exemplary abstraction model layers, in accordance with an embodiment of the present principles.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resilient distributed garbage collection.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. In a distributed processing system having multiple processing nodes including alive nodes and dead nodes, a method for collecting an object from the alive nodes, the method comprising:
    maintaining a separate count value for each of remote nodes at which the object is remotely-referenced;
    collecting the object for garbage collection when the separate count value for all of the remotes nodes is zero; and
    adding, at a first remote sending node for each of other remote receiving nodes, a respective per receiving node sending counter responsive to a remote reference of the object being sent from the first remote node a respective one of the other remote receiving nodes, each of the at least one per node sending counter added at the first remote node to count a number of remote-references of the object being sent from the first remote node to the respective one of the other remote receiving nodes.

2. The method of claim 1, further comprising updating a sending remote-reference count value when a remote-reference to the object is sent from a first remote node to a second remote node by:
    incrementing, by the first remote node, the sending remote-reference count value for the second remote node before sending the remote-reference;
    providing, by the second remote node responsive to receiving the remote-reference, a notification to a home node of the object;
    responsive to receiving the notification, incrementing the sending remote-reference count value for the second remote node and providing a further notification to the first remote node, by the home node; and
    upon receiving the further notification, decrementing, by the first remote node, the sending remote-reference count value for the second remote node.

3. The method of claim 2, further comprising:
    suppressing the collection of the object when the sending remote-reference count value therefor at any of the remote nodes is non-zero; and
    clearing the sending remote-reference count value for the second remote node when the second remote node is dead.

4. The method of claim 1, further comprising setting a strong reference to the object in the distributed processing system to suppress local collection of the object.

5. The method of claim 4, further comprising controlling the strong reference to the object using an array structure constructed for the object that maintains a number of remote-references to the object from each of the multiple processing nodes.

6. The method of claim 4, wherein a respective different array is constructed and a respective strong reference is set, for each of a plurality of objects in the distributed processing system.

7. A computer program product for a method for collecting an object in a distributed processing system having multiple processing nodes including alive nodes and dead nodes, the computer program product comprising a non-transitory computer readable storage medium having program instructions embodied therewith, the program instructions executable by a computer to cause the computer to perform a method comprising:

maintaining a separate count value for each of remote nodes at which the object is remotely-referenced;

collecting the object for garbage collection when the separate count value for all of the remotes nodes is zero; and adding, at a first remote sending node for each of other remote receiving nodes, a respective per receiving node sending counter responsive to a remote reference of the object being sent from the first remote node to a respective one of the other remote receiving nodes, each of the at least one per node sending counter added at the first remote node to count a number of remote-references of the object being sent from the first remote node to the respective one of the other remote receiving nodes.

8. The computer program product of claim 7, further comprising updating a sending remote-reference count value when a remote-reference to the object is sent from a first remote node to a second remote node by:

incrementing, by the first remote node, the sending remote-reference count value for the second remote node before sending the remote-reference;

providing, by the second remote node responsive to receiving the remote-reference, a notification to a home node of the object;

responsive to receiving the notification, incrementing the sending remote-reference count value for the second remote node and providing a further notification to the first remote node, by the home node; and upon receiving the further notification, decrementing, by the first remote node, the sending remote-reference count value for the second remote node.

9. The computer program product of claim 8, further comprising:

suppressing the collection of the object when the sending remote-reference count value therefor at any of the remote nodes is non-zero; and clearing the sending remote-reference count value for the second remote node when the second remote node is dead.

10. The computer program product of claim 7, further comprising adding a plurality of sending counters to a sending one of the multiple processing nodes, each of the sending counters for counting a number of remote references to the object that are sent to a respective one of a plurality of receiving ones of the multiple processing nodes.

11. The computer program product of claim 7, further comprising setting a strong reference to the object in the distributed processing system to suppress local collection of the object.

12. The computer program product of claim 11, further comprising controlling the strong reference to the object using an array structure constructed for the object that maintains a number of remote-references to the object from each of the multiple processing nodes.

13. The computer program product of claim 11, wherein a respective different array is constructed and a respective strong reference is set, for each of a plurality of objects in the distributed processing system.

* * * * *